A. W. SHANK.
CUSHION TIRE.
APPLICATION FILED JUNE 6, 1910.
987,751.
Patented Mar. 28, 1911.
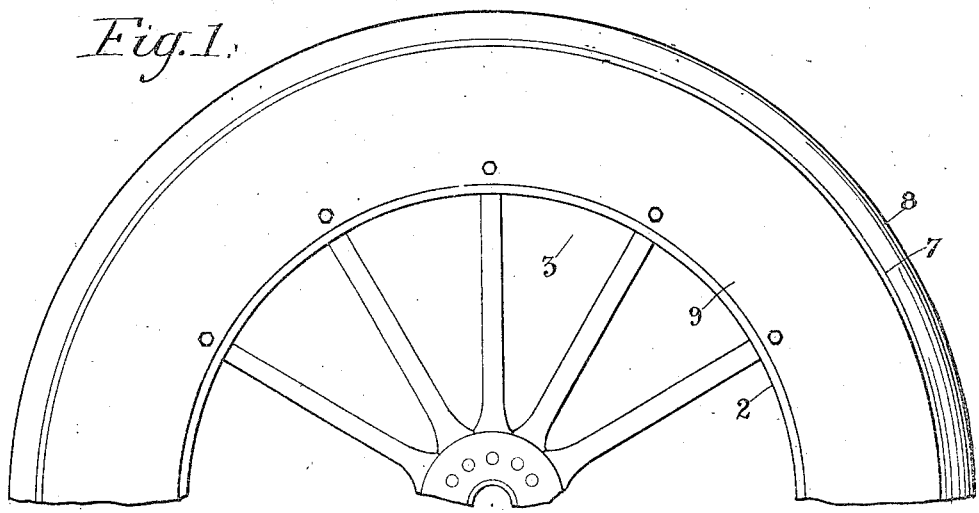
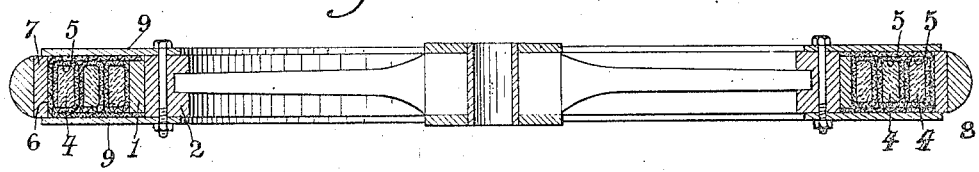
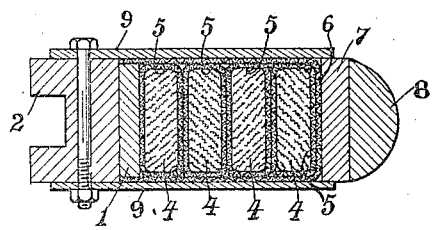
Witnesses
A. M. Shannon.
A. M. Dow.
Inventor
AUGUSTUS W. SHANK
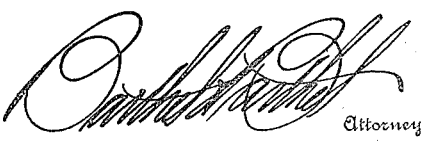
Attorneys

UNITED STATES PATENT OFFICE.

AUGUSTUS W. SHANK, OF DETROIT, MICHIGAN, ASSIGNOR, BY DIRECT AND MESNE ASSIGNMENTS, OF FIVE-SIXTEENTHS TO AUGUSTUS P. MOTT AND FIVE-SIXTEENTHS TO WILLIAM W. TACKABURY, BOTH OF DETROIT, MICHIGAN.

CUSHION-TIRE.

987,751.       Specification of Letters Patent.      Patented Mar. 28, 1911.

Application filed June 6, 1910. Serial No. 565,179.

*To all whom it may concern:*

Be it known that I, AUGUSTUS W. SHANK, a citizen of the United States of America, residing at Detroit, in the county of Wayne and State of Michigan, have invented certain new and useful Improvements in Cushion-Tires, of which the following is a specification, reference being had therein to the accompanying drawings.

This invention relates to cushion tires for vehicle wheels and more particularly to certain features of construction whereby the use of rubber or like expansive material is eliminated.

The invention consists in the matters hereinafter set forth, and more particularly pointed out in the appended claims.

Referring to the drawings, Figure 1 is a plan view of a wheel, partly broken away provided with a tire that embodies features of the invention; Fig. 2 is a view in cross section through the wheel; and Fig. 3 is a view in enlarged section through the tire and adjacent portions of the wheel showing a modification of the tire.

In the drawings an elastic hoop 1 of wood or the like preferably bent of a single piece with its ends permanently united is arranged to fit the rim or felly 2 and wheel 3 of conventional construction. A series of layers of felt 4 each tightly wrapped in a flexible cover 5 of canvas or the like are forced upon the rim 1 and are secured thereto permanently by an outer covering 6 of flexible fabric such as canvas or the like whose margins are secured to the margins of the inner hoop. Preferably the outer covering is water proof. An outer elastic band 7, preferably of a single piece of wood bent on itself with its ends permanently secured, is forced on to the outer casing 6 so as to compress the felt still farther between it and the inner hoop or ring 1. Any suitable tread 8 of rubber or like material may be applied to the outer face of the hoop 7. To mount the same upon a wheel it is preferable to provide annular guide strips 9 which are secured detachably to the wheel rim or felly and are of sufficient width to cover the cushion tire for the major portion of its width.

In assembling the parts it is preferable to mount the ring 1 upon the solid center core with the outer ring 7 concentrically secured in a suitable clamp or form, with the cover 6 secured to one margin of the ring 1 and turned back over the ring to allow the insertion of the successive layers of wrapped felt which are forced into the space between the band in such manner as to compress them tightly, the cover 6 being then drawn back and smoothly secured to the inner ring 1. By this means the felt is constantly under compression.

As a result of this method of construction and arrangement of parts a very resilient cushion tire is obtained which does not deteriorate under use and which has all the elasticity of the rubber tire.

One feature of the invention is the separate wrapping and compressing of the layers of felt so that they do not mat further under the vibratory action to which they are subjected in use as is likely to be the result with a body of felt of comparatively large cross section.

Another feature is the employment of an outer resilient ring or hoop of wood or the like which aids in transmitting the shock to the inner circumference of the felt cushion and gives added life and spring to the cushion.

Obviously changes in the details of construction may be made without departing from the spirit of the invention and I do not wish to limit myself to any particular form or arrangement of parts.

What I claim as my invention is:—

1. The combination with a wheel provided with a felly, and annular guide strips detachably secured on the opposite sides of the felly of a cushion tire having an inner resilient ring frictionally engaging the felly between the guide strips, an outer ring of resilient material, and layers of separately wrapped felt compressed between the inner and outer rings.

2. The combination of a wheel having a felly and a pair of guide strips detachably secured at the opposite sides thereof, with a cushion tire consisting of an inner band fitting the wheel felly between the guide rings, an outer ring of resilient material, a body of felt compressed between the rings, and a covering securing the felt to the inner ring.

In testimony whereof I affix my signature in presence of two witnesses.

AUGUSTUS W. SHANK.

Witnesses:
 ANNA M. DORR,
 C. R. STICKNEY.